Patented Sept. 7, 1926.

1,598,985

UNITED STATES PATENT OFFICE.

THEODORUS PETRUS LUDOVICUS PETIT, OF VELSEN, NETHERLANDS.

PROCESS FOR REMOVING HYDROGEN SULPHIDE FROM GASES.

No Drawing. Application filed March 7, 1923, Serial No. 623,545, and in the Netherlands March 16, 1922.

It is known that hydrogen sulphide can be removed from gases by washing the gas with a solution of alkali-metal carbonate or a suspension of alkaline earth carbonate and that the washing liquid can be regenerated by conducting through it air which may or may not contain carbon dioxide. It is known that such presence of carbon dioxide facilitates the regeneration. It is however not advantageous to use flue gases for the regeneration, because they have many impurities and require an extensive purification.

If flue gases were used, it would further be necessary to heat the regenerated liquid in order to convert into carbonate the bicarbonate which has been produced, the carbonate being required for the absorption of $H_2S$.

When the air used for regeneration contains less than 2 per cent of carbon dioxide, heating the liquid (to expel carbon dioxide) may be omitted. Yet even then it is advantageous to convert the bicarbonate into carbonate by warming as much as possible, because the pure carbonate absorbs sulphuretted hydrogen much better than does carbonate, which is in equilibrium with a current of air at ordinary temperature, containing carbon dioxide.

A process based on these lines has been followed. The $H_2S$ was absorbed by a solution containing 2–5 per cent of $Na_2CO_3$; the regeneration was carried out by passing a large quantity of air through the solution; in this process recovery of sulphur was not possible.

By the present invention regeneration of the alkali-metal carbonate solution by means of gases containing carbon dioxide becomes very advantageous when the carbon dioxide used is that present in the form of bicarbonate in the regenerated washing liquid which has been freed from $H_2S$.

According to the invention the washing liquid, which has been freed from $H_2S$ by a current of gas containing carbon dioxide, is heated, with or without passage of steam or inert gases through it, and the carbon dioxide thus liberated is used for expelling sulphuretted hydrogen from another supply of washing liquid.

The carbon dioxide therefore is retained in circulation. In the regeneration process, when hydrogen sulphide is expelled, the carbon dioxide is absorbed and afterwards liberated again by heating; at the same time the washing liquid is freed from all excess of carbon dioxide and, after cooling, becomes exceptionally favorable for absorbing $H_2S$.

It is evident that in this circulation of the carbon dioxide losses are unavoidable because the gases that remove $H_2S$ will also carry away a part of the $CO_2$. These losses however are fully compensated by the carbon dioxide which is absorbed by the liquid from the unpurified gas together with the $H_2S$. This gas (town gas, coke oven gas, or the like) contains about 2 per cent of $CO_2$.

With respect to known processes the invention has in the first place the important advantage that a much smaller plant is required. In the second place no flue gases are used and the difficult and expensive purification is thus eliminated.

As compared with the regeneration process in which air with less than 2 per cent of $CO_2$ is used without heating, it has the additional advantage that for absorbing $H_2S$ alkali-metal carbonate solutions are used which are wholly free from bicarbonate, so that a much smaller absorption plant is required. The heating of the bicarbonate solution and the cooling of the carbonate solution before the absorption require little heat and little cooling water, respectively, because heat exchange apparatus may be used to a large extent. The liquid coming from the absorption apparatus may be used for cooling regenerated carbonate solution, and may thereby be preheated so that it loses $H_2S$ more easily and for driving off $H_2S$ also only a small plant is required. The solution containing bicarbonate freed from $H_2S$, is therefore also somewhat preheated when it enters the apparatus in which the bicarbonate is decomposed by heat, for instance by means of auxiliary steam or air.

A further advantage of the process is that the carbon dioxide content of the gas current serving to liberate the $H_2S$ can be wholly controlled. With a high percentage of carbon dioxide the expulsion of $H_2S$ is facilitated and requires a smaller plant, but on the other hand a higher temperature is required for producing the gas current containing carbon dioxide.

A high percentage of carbon dioxide and a moderately raised temperature are favorable for a high percentage of $H_2S$ in the gas leaving the regenerating apparatus.

One may choose the conditions most advantageous for each case.

One can control also in this manner to a large extent the content of $H_2S$ in the gas current carrying the liberated $H_2S$. The application of this $H_2S$ is very much facilitated thereby, whether for the production of sulphur or sulphuric acid or of some other product.

As a washing liquid a solution of potash (for example, of 25 per cent strength) is preferred because the carbonate and bicarbonate of potassium are more soluble than those of sodium so that a plant using potash may be comparatively small in that it can use a strong solution.

What I claim is:—

1. A cyclic process of continuously removing hydrogen sulphide from gases, essentially comprising the following steps in combination: washing the gas with an alkali-metal carbonate solution to absorb the hydrogen sulphide therefrom; passing a gas containing carbon dioxide through the washing solution to expel the absorbed hydrogen sulphide; heating the solution thus obtained to regenerate the alkali-metal carbonate solution by decomposing the bicarbonate which was produced and to liberate excess carbon dioxide; passing through another supply of washing solution the liberated carbon dioxide in concentrated condition; and then washing, with the regenerated alkali-metal carbonate solution, a fresh supply of the hydrogen-sulphide-containing gas.

2. A cyclic process of continuously removing hydrogen sulphide from gases, essentially comprising the following steps in combination: washing the gas with an alkali-metal carbonate solution to absorb the hydrogen sulphide therefrom; passing a gas containing carbon dioxide through the washing solution to expel the absorbed hydrogen sulphide; heating the solution thus obtained to regenerate the alkali-metal carbonate solution by decomposing the bicarbonate which was produced and to liberate excess carbon dioxide; passing a current of steam through the solution during the heating step; passing through another supply of washing solution the liberated carbon dioxide in concentrated condition; and then washing, with the regenerated alkali-metal carbonate solution, a fresh supply of the hydrogen-sulphide-containing gas.

3. A cyclic process of continuously removing hydrogen sulphide from gases, essentially comprising the following steps in combination: washing the gas with a potassium carbonate solution to absorb the hydrogen sulphide therefrom; passing a gas containing carbon dioxide through the potassium carbonate solution to expel the absorbed hydrogen sulphide; heating the solution thus obtained to regenerate the potassium carbonate solution by decomposing the bicarbonate which was produced and to liberate excess carbon dioxide; passing through another supply of used potassium carbonate washing solution the liberated carbon dioxide in concentrated condition; and then washing, with the regenerated potassium carbonate solution thus treated, a fresh supply of the hydrogen-sulphide-containing gas.

In testimony whereof I affix my signature.

THEODORUS PETRUS LUDOVICUS PETIT.